CIRCUIT ARRANGEMENT FOR PRODUCING A SAWTOOTH CURRENT

Filed Sept. 15, 1966 6 Sheets-Sheet 1

INVENTORS
JOHANNES J. REICHGELT
WILHELMUS TH.H. HETTERSCHEID
BY
Frank R. Trifari
AGENT

INVENTORS
JOHANNES J. REICHGELT
WILHELMUS TH.H. HETTERSCHEID
BY

[signature]
AGENT

INVENTORS
JOHANNES J.REICHGELT
WILHELMUS TH.H.HETTERSCHEID
BY
AGENT

CIRCUIT ARRANGEMENT FOR PRODUCING A SAWTOOTH CURRENT

INVENTORS
JOHANNS J. REICHGELT
WILHELMUS TH.H. HETTERSCHEID
BY
AGENT

INVENTORS
JOHANNES J. REICHGELT
WILHELMUS TH.H. HETTERSCHEID
BY
Frank R. Jifari
AGENT

CIRCUIT ARRANGEMENT FOR PRODUCING A SAWTOOTH CURRENT

Filed Sept. 15, 1966 6 Sheets-Sheet 6

INVENTORS
JOHANNES J. REICHGELT
WILHELMUS TH.H. HETTERSCHEID
BY
Frank R. Jeffrey
AGENT 3,504,224
CIRCUIT ARRANGEMENT FOR PRODUCING A SAWTOOTH CURRENT Johannes Joseph Reichgelt and Wilhelmus Theodorus Hendrikus Hetterscheid, Nijmegen, Netherlands, assignors, by mesne assignments, to U.S. Philips Corporation, a corporation of Delaware Filed Sept. 15, 1966, Ser. No. 579,539
Claims priority, application Netherlands, Sept. 17, 1965, 6512106
Int. Cl. H01j *29/70*
U.S. Cl. 315—27 12 Claims

ABSTRACT OF THE DISCLOSURE

A deflection circuit that includes a unidirectional transistor having its collector connected to the deflection coil. Inductive coupling means are provided between the base and emitter for applying a switching signal thereto. The switching signal cuts off the transistor for a period that is longer than the flyback period whereby the deflection coil reverses polarity to forward bias the base-collector junction of the transistor which allows a reverse current to flow in the deflection coil via said base-collector junction to initiate the forward stroke of the deflection current. The amplitude of the transistor supply voltage is at least ten times the peak-to-peak amplitude of the switching signal.

The present invention relates to a deflection circuit for producing a sawtooth current in the line-deflection coils of a display tube. The deflection circuit is being provided with a transistor having an output circuit that includes the deflection coils. By means of an inductive coupling between the base and the emitter electrode, a pulsatory switching signal is applied to the transistor which cuts off and releases the transistor periodically.

Such a circuit arrangement is known inter alia from the U.S. Patent 3,143,686. However, the transistor used in this circuit arrangement is of the symmetrical type (bi-directional transistor, of column 3, line 53 of the aforesaid U.S. patent). A circuit arrangement having asymmetrical transistor has the disadvantage, however, that the duration of the switching pulses cutting off the transistor must be exactly equal to the flyback time of the sawtooth current since it is necessary to drive the transistor immediately back into saturation at the beginning of the stroke time.

However, to drive the transistor so that its cut-off time is exactly equal to the flyback time is much too critical for practical purposes, since the cut-off time is determined by the switching signal and depends upon the adjustment of the oscillator supplying the switching signal, whereas the flyback time depends upon the value L of the overall inductance in the output circuit of the transistor, and upon the value C of the stray capacitances and additional capacitances, if any, in this output circuit. It is difficult to choose for each case, especially in mass production, the conditions in the oscillator and in the said output circuit so that the aforementioned requirement of equality is fulfilled. Moreover, the equality originally adjusted accurately may be subsequently lost due to aging or other variation in the circuit parameters during the use of the circuit arrangement.

For all these reasons, a circuit arrangement having a symmetrical transistor the line output transistor is not suitable for practical use.

Another known deflection circuit uses an asymmetrical transistor in which the damper diode is dispensed with by forward biasing the base-collector junction of the transistor so that a reverse current can flow through the deflection coil via said base-collector junction at the start of the stroke period. This circuit exhibits a discontinuity in the linear portion of the sawtooth current at the point the current path changes from base-collector to emitter-collector.

The circuit arrangement in accordance with the invention provides a solution which renders it suitable for practical use and it is characterized in that the transistor used is an essentially asymmetrical or unidirectional transistor. In addition, the duration of the pulses of the switching signal which cut-off the transistor is longer than the flyback time of the sawtooth current so that at the beginning of the stroke time, a current, reverse to that at the end of the stroke time, may flow through the deflection coils via the forward biased base-collector diode of the transistor, while the supply voltage of the transistor exceeds by many times, for example, by ten times, the peak-to-peak value of the switching signal applied between the base and the emitter electrode. The inductive coupling includes an inductance directly connected between the base and the emitter of the transistor.

A few possible embodiments of circuit arrangements in accordance with the invention will now be described more fully with reference to the accompanying figures, in which.

Figures 1, 2:
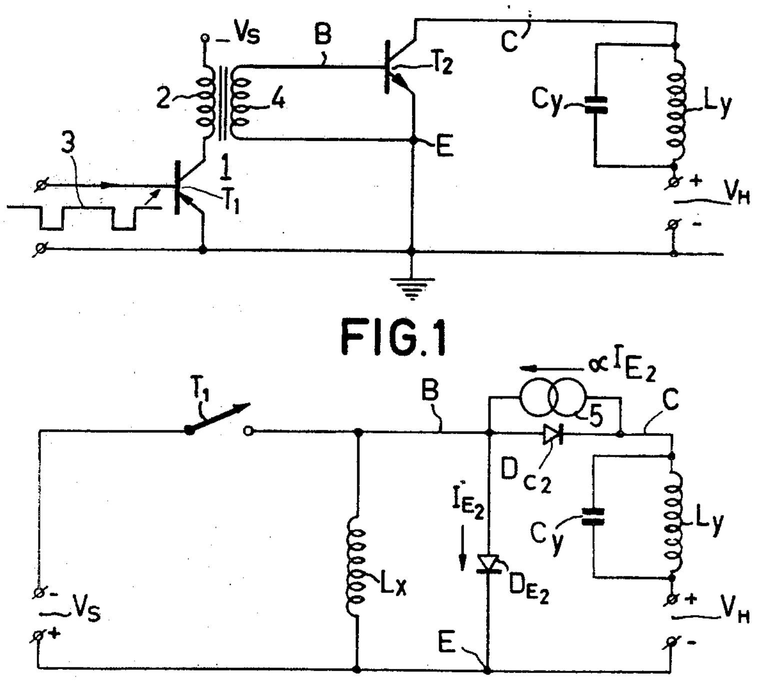
FIG. 1 shows the basic circuit arrangement in accordance with the invention.
FIGS. 2, 3 and 4 show equivalent circuit diagrams of the circuit arrangement shown in FIG. 1 for explaining its operation.
Figure 6:
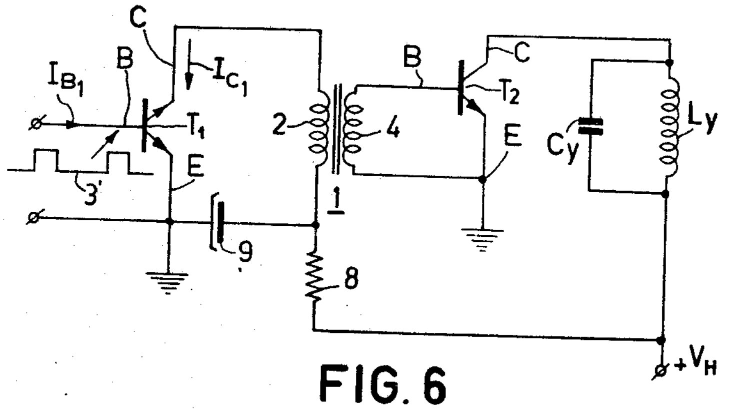
Figure 8:
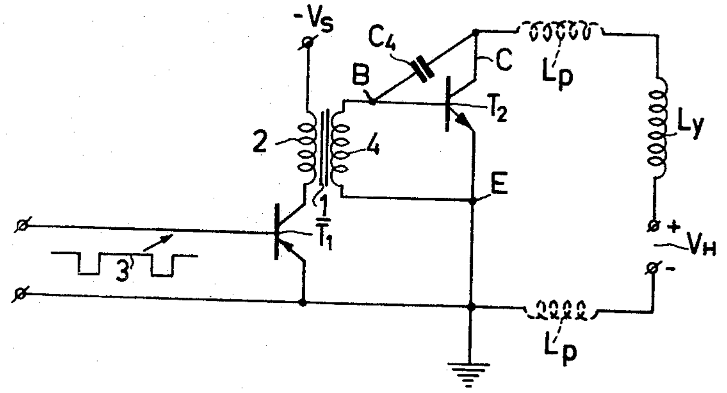
Figure 9:
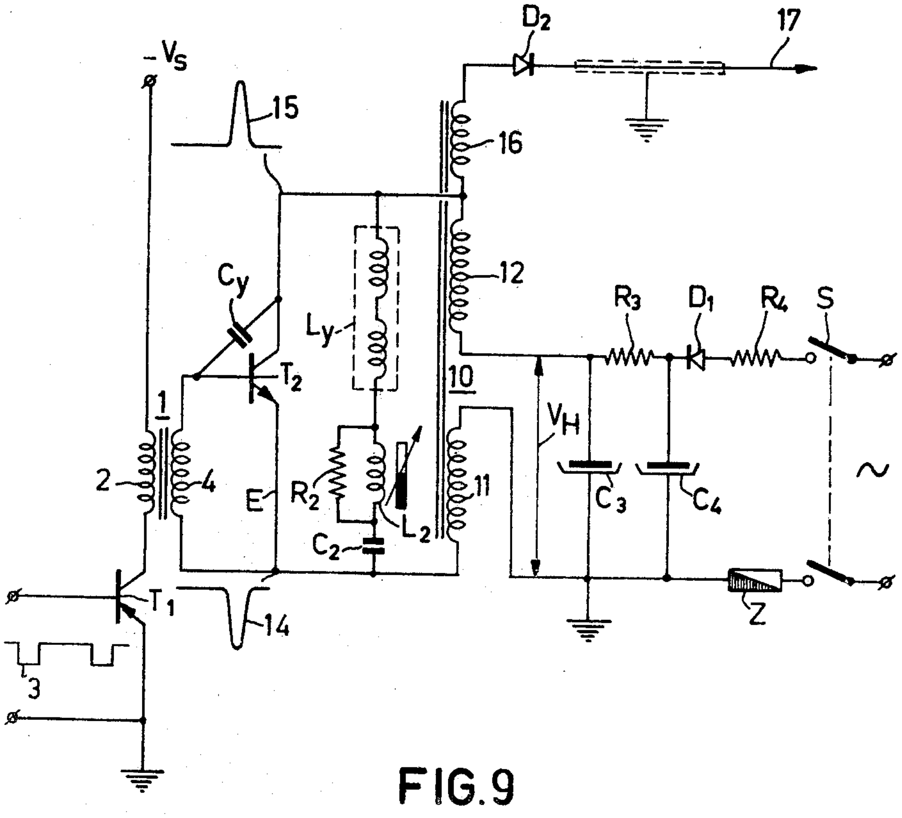
Figure 10:
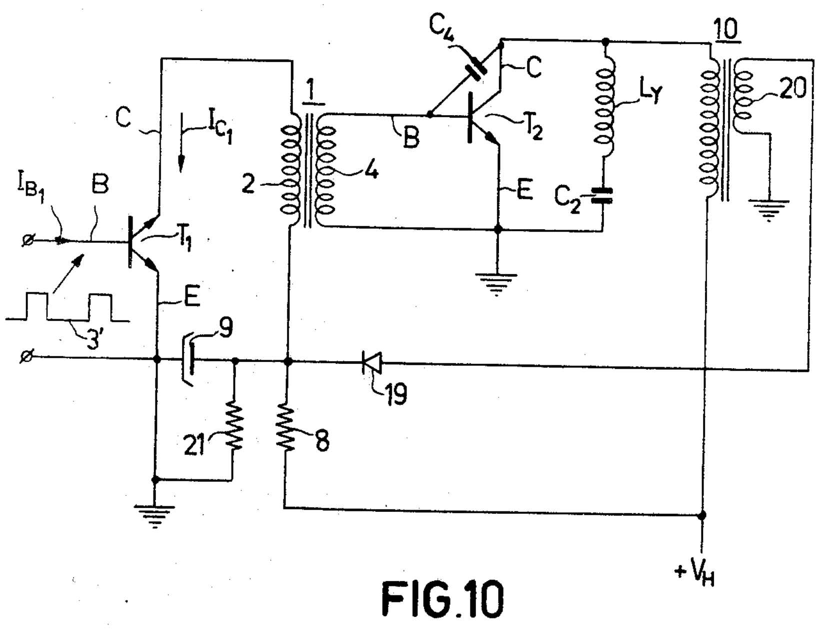

FIGS. *5a* to *5g* illustrate curves of currents and voltages that may occur in the circuit arrangement shown in FIG. 1, FIG. 6 shows a second embodiment of a circuit arrangement in accordance with the invention in which the driver transistor is a symmetrical transistor, FIGS. *7a* to *7g* show curves of currents and voltages that may occur in the circuit arrangement shown in FIG. 6, FIG. 8 shows a third embodiment of the invention in which a capacitor is connected between the base electrode and the collector electrode of the output transistor in order to suppress parasitic oscillations, FIG. 9 shows a further developed circuit diagram of the circuit arrangement of FIG. 8, FIG. 10 shows a further embodiment of the invention.

In FIG. 1, the transistor $T_1$ is a driver transistor. The collector circuit includes a transformer 1. The primary winding 2 of the transformer 1 connects the collector electrode of the transistor $T_1$ to the supply voltage source $-V_s$. The switching signal 3, originating from an oscillator, not shown, is applied between the base electrode and the emitter electrode of the transistor $T_1$. The switching signal releases the transistor $T_1$ during the flyback time of the sawtooth current that will flow through the deflection coils $L_y$ and during part of the stroke time of the sawtooth current. The signal cuts off the transistor $T_1$ during the remaining part of the stroke time. The secondary winding 4 of the transformer 1 is connected between the base electrode B and the emitter electrode E of a line output transistor $T_2$. The collector electrode C of the output transistor $T_2$ is connected to the parallel-combination of a deflection coil $L_y$ and a capacitor $C_y$, while the emitter electrode E is connected to ground. Between the end of the said parallel-combination remote from the collector electrode and ground there is connected a supply voltage source which supplies a supply voltage $V_H$ for the line output transistor $T_2$. As will be described hereinafter, it is required for the circuit arrangement in accordance with the invention that the voltage $V_H$ exceeds by many times the switching voltage across the base-emitter diode of the transistor $T_2$. For example, in the embodiment shown in FIG. 1, the voltage $V_H$ is equal to 220 v., whereas the voltage $V_s$ amounts to only 7 v. The transformation ratio of the transformer 1 is equal to 1:1. The voltage $V_s$ and the transformation ratio determine the peak-to-peak value of the ultimate switching signal which is operative between base and emitter electrodes of the transistor $T_2$ via the secondary 4.

As stated in the preamble, the line ouput transistor $T_2$ of FIG. 1 is of a very particular structure. In the first place this transistor must be capable of withstanding a very high voltage.

Secondly, this transistor must essentially be asymmetrical, which implies that the transistor $T_2$ must be capable of withstanding a base current which, at the beginning of the stroke time, is equal to the current flowing through the collector circuit. Therefore, the base region of the transistor $T_2$ must be calculated for conveying such a high current. As will be explained hereinafter, finally a situation arises in which the base-collector diode $D_{C2}$ and the base-emitter diode $D_{E2}$ are unblocked simultaneously. As a matter of course, the transistor $T_2$ must be suitable for use in this situation in which the diodes are both unblocked and convey comparatively high currents. A possible method of constructing such a transistor has been described in a copending U.S. application, Ser. No. 587,456, filed Oct. 18, 1966.

In order to explain the foregoing and the operation of the circuit arrangement shown in FIG. 1, FIG. 2 shows the equivalent circuit diagram of the circuit arrangement of FIG. 1. In this figure, the transistor $T_1$ is represented as a switch $T_1$. The transformer 1 is assumed to be an ideal transformer having an inductance value $L_x$ and connected in parallel with the base-emitter diode $D_{E2}$. In view of the fact that the transistor $T_2$ is an npn-type transistor, the anode of this diode is connected to the base point B while its cathode is connected to the emitter point E, which points correspond with those indicated in FIG. 1.

The switch $T_1$ is connected in series with the supply voltage source $V_s$ supplying the voltage applied between the base electrode B and the emitter electrode E of the transistor $T_2$ when the transistor $T_1$ is in the conductive state, which corresponds with the closed state of the switch $T_1$ in FIG. 2.

In FIG. 2, the diode $D_{C2}$ represents the base-collector diode of the transistor $T_2$. This diode is shunted by a source 5 which supplies the amplified emitter current $\alpha I_E$. The equivalent circuit diagram of FIG. 2 also includes the horizontal deflection coil $L_y$, its bridging capacitance $C_y$ and the supply voltage source $V_H$. As is apparent from FIG. 2, a current source $\alpha I_C$ is not included. In fact, this source would have to be connected in parallel with the base-emitter diode $D_{E2}$, but, as stated above, the transistor $T_2$ is essentially asymmetrical, which means that the current source $\alpha I_C$ supplies a negligibly low current and may therefore be omitted.

The switching signal 3 ensures that the transistor $T_1$ operating as a driver transistor is alternately in the conductive and in the non-conductive state. Consequently, a pulsatory signal of a value $(1+b)V_s$ at the instant $t_2$ and of a value $(1+c)V_s$ at the instant $t_4$ is produced across the secondary 4. This can be explained as follows. If the transistor $T_1$ is conducting (switch $T_1$ is closed), the primary 2 is at a voltage of $V_s$ volt. Since the transformation ratio between the windings 2 and 4 is approximately 1:1, the value of the voltage at the secondary 4 is equal to that of the voltage at the primary 2. Consequently, in the time interval from 0 to $t_2$ in which the transistor $T_1$ is conducting, the voltage at the secondary 4 is also equal to $V_s$ volt. However, since the D.C. component is lost due to the inductive coupling between the windings 2 and 4, the switching signal $V_{BE2}$ operative between the base electrode and the emitter electrode of the transistor $T_2$ will have an average value of 0, which is represented by the line 6 in FIG. *5a*. Since the area below the line 6 must consequently be equal to that above it, the voltage exceeds the line 6 by a value $bV_s$ at the instant $t_2$ and by a value $cV_s$ at the instant $t_4$. As is apparent from FIG. *5a*, the switching voltage $V_{BE2}$ is not constant during the time the transistor $T_2$ conveys current, but slightly increases. This is due to the fact that during this period the emitter current $I_{E2}$ is not constant but increases linearly, as is apparent from FIG. *5e*.

Figure 3:
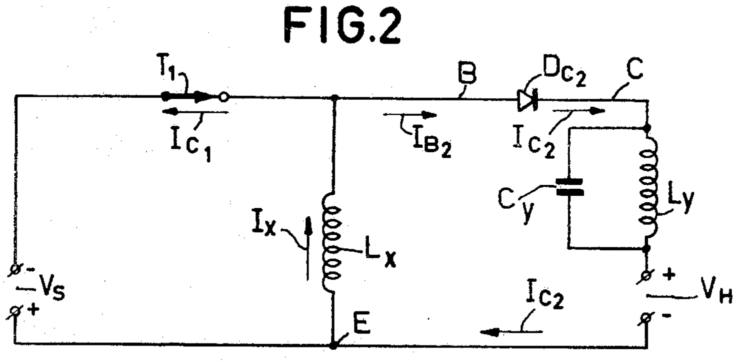

Therefore, the voltage $V_{BE2}$ has a negative value of $V_s$ volt during the time interval from 0 to $t_2$. However, at the instant $t_2$ the voltage $V_{BE2}$ jumps from the value $-V_s$ to a value $+bV_s$. Hence, in FIG. 2, and also in the following FIGURES 3 and 4, the voltage source connected with the time switch $T_1$ supplies a direct voltage of $V_s$ volt, i.e. the cut-off voltage operative between the base electrode and the emitter electrode of the transistor $T_2$ if the switch $T_1$ is closed during the time interval from 0 to $t_2$. At the instant $t_2$, the switch $T_1$ is opened and at that instant the voltage at the base electrode B is equal to $+bV_s$ volt. The starting point lies at the instant 0 and it is assumed that at this instant a current $I_{Ly}$ flows through the deflection coil $L_y$, which current has the value indicated in FIG. *5b*. At the instant 0, the switch $T_1$ is closed, which means that the transistor $T_2$ is cut off. The electromagnetic energy accumulated in the coil $L_y$ as, a result of the current flowing through this coil at the instant 0, starts oscillating decrementally along a cosinusoidal curve so that the frequency and the flyback time are determined by the values of $L_y$ and $C_y$. This decremental oscillation occurs from the instant 0 to the instant $t_1$, i.e. the flyback time of the sawtooth current $I_{Ly}$. The fact that this decremental oscillation actually dies out at the instant $t_1$ can be explained as follows. As a result of the cosinusoidal decremental oscillation of the current $I_{Ly}$, the voltage across the parallel circuit oscillates decrementally along a sinusoidal curve. Consequently, the voltage $V_{CE2}$ at the collector C of the transistor $T_2$ follows a curve as shown in FIG. *5f* during the time interval from 0 to $t_1$. This decremental oscillation of the voltage continues until the collector electrode C of the transistor $T_2$ becomes negative with respect to the base electrode B thereof. This is the case at the instant $t_1$. If the collector electrode C is negative with respect to the base electrode B, the base-collector diode $D_{C2}$ conveys a current $I_{C2}$, so that the situation arises which is shown in FIG. 3. If the switch $T_1$ is closed, the diode $D_{E2}$ does not convey current so that the current $\alpha I_{E2}=0$. Therefore, the current source 5 and the base-emitter diode $D_{E2}$ are omitted in FIG. 3. However, if the diode $D_{C2}$ is conducting, a constant voltage constituting the sum of the voltages $V_H$ and $V_s$ is again produced across the deflection coil $L_y$. The sum of these voltages therefore determines the slope of the sawtooth current which flows from the instant $t_1$ to the instant $t_2$. Moreover, the decremental oscillation of the circuit $L_yC_y$ is finished at the instant $t_1$. When the transistor $T_2$ has the aforementioned properties, it is achieved that the collector current $I_{C2}$ flowing during the time interval from $t_1$ to $t_2$ is equal to the instantaneous base current $I_{B2}$, since the emitter current $I_{E2}$ and the amplified emitter current $\alpha I_{E2}$ are both equal to 0. Therefore, the base current $I_{B2}$ will have the same configuration as the collector current $I_{C2}$ during the time interval from $t_1$ to $t_2$, which is clearly apparent from FIGS. *5c* and *5d*. In FIG. *5c*, the collector current $I_{C2}$ flowing during the time interval from $t_1$ to $t_2$ is negative, since it is opposite to the current $\alpha I_{E2}$ which is the normal collector current when the transistor $T_2$ actually operates as a transistor. The current $I_{C2}=I_{B2}$ flows back through the switch $T_1$. During the flyback time from 0 to $t_1$, when $I_{B2}$ is not yet present, the current through the switch $T_1$ is determined by $$I_x=\frac{V_s}{L_x}t_1$$

that is to say by the value of the coil $L_x$ and the applied voltage $V_s$. During the time interval from $t_1$ to $t_2$, the current through the switch $T_1$ is equal to $I_x - I_{BE2}$.

This is apparent from FIG. 5*g* in which the collector current $I_{C1}$ is shown. Therefore, the current flowing back through the base circuit of the transistor $T_2$ reduces the current of the driver transistor $T_1$. The interrupted line in FIG. 5*g* indicates the path of the current flowing through $T_1$ if this effect did not occur.

This effect can be considered as an additional advantage of the circuit arrangement in accordance with the invention, since, as is apparent from the numbers stated in FIG. 5*c*, the collector current $I_{C2}$ has a value of −0.6A at the instant $t_1$, which value decreases to approximately 0.3A at the instant $t_2$. In this time interval the base current $I_{B2}$ is equal to the collector current $I_{C2}$. Since the base current also has a comparatively high value owing to the low value of $\alpha'$ during the remaining part of the time interval, i.e. from $t_2$ to $t_4$, this means that the base current $I_{B2}$ constantly has a comparatively high value. This current must ultimately be supplied through the driver transistor $T_1$. If the advantage of the decrease in the collector current $I_{C1}$ during the time interval $t_1$ to $t_2$ would not be found, the full magnetization current for the transformer 1 would have to be supplied by the transistor $T_1$ in order to provide the possibility of the desired base current $I_{B2}$ flowing during the time interval from $t_2$ to $t_4$. During the time interval from $t_1$ to $t_2$, the collector current $I_{C1}$ would then have a configuration as represented by the interrupted line of FIG. 5*g*. In consequence thereof, the average collector current $I_{C1gem}$ would not have the value shown by the dot-and-dash line 7 in FIG. 5*g* but this value would be considerably higher. This would imply not only that the driving power supplied is much higher but also that the transistor $T_1$ must be capable of withstanding a much greater dissipation. This is avoided by the favourable additional effect of the decreasing collector current $I_{C1}$ during the time interval $t_1$ to $t_2$.

Figure 4:
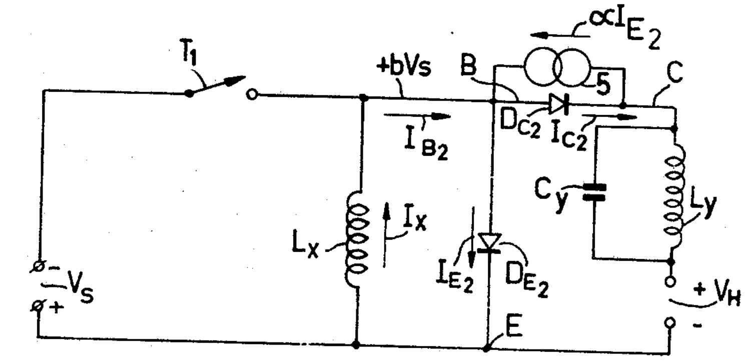

At the instant $t_2$, the switch $T_1$ is opened and a situation arises as shown in the equivalent diagram of FIG. 4. As appears from FIG. 5*a*, when the switch $T_1$ is opened, the voltage at the base electrode jumps to a value $+bV_s$. This implies that, when the switch $T_1$ is opened, the voltage at point B jumps by $(1+b)V_s$ volt. As is apparent from FIG. 5*f*, however, the voltage at the point C will also jump by the same value, since the base-collector diode $D_{C2}$ continues to conduct. For the voltage at the anode of diode $D_{C2}$ becomes positive so that the diode tends to remain conducting. The voltage across a conducting diode is substantially zero, however, so that a jump of the voltage at the point B results in a jump of the voltage at the point C. Owing to the said voltage jump, the voltage across the coil $L_y$ is also varied. When the switch $T_1$ was closed the voltage across this coil was equal to $V_H + V_s$ volt, and after the instant $t_2$ this voltage is equal to $V_H - bV_s$ volt. Since the voltage $V_H$ is very high, however (in the relevant embodiment 220 v.), and the voltage $V_s$ is relatively low, in this case 7 v., the voltage $(1+b)V_s$ volt, which is the difference between the voltages across the coil $L_y$ before and after the instant $t_2$, is negligibly low with respect to the voltage $V_H$. The bend occurring in the collector current $I_{C2}$ and hence in the current $I_{Ly}$ as a result of this voltage jump is therefore also negligibly small.

This bend could therefore not be observed on an oscillograph.

Consequently, although the collector current $I_{C2}$ substantially does not vary when the switch $T_1$ is opened, the base current $I_{B2}$ and the emitter current $I_{E2}$ of the transistor $T_2$ and the collector current $I_{C1}$ of the transistor $T_1$ are varied indeed, since when the switch $T_1$ is opened, the transistor current $I_{C1}$ becomes 0.

Since the current $I_x$ through the coil $L_x$ cannot jump either and this current was equal to $I_{B2} + I_{C1}$ before the instant $t_2$, after the instant $t_2$ the base current $I_{B2}$ must be equal to $I_x$ due to the disappearance of the collector current $I_{C1}$. However, since the current $I_x$ cannot jump, this jump must be effected by the base current $I_{B2}$. As is apparent from FIG. 5*d*, the base current $I_{B2}$ jumps by slightly more than 0.6A (from approximately 0.3A to slightly more than 0.9A), which is just the value of the collector current $I_{C1}$ at the instant $t_2$. Since the collector current $I_{C2}$ substantially does not vary, this additional current must be passed by the base-emitter diode $D_{E2}$ through which an emitter current $I_{E2}$ begins to flow which exhibits a jump equal to that of the current $I_{B2}$.

Since, as stated above, the diode $D_{C2}$ remains unblocked at the instant $t_2$ and the collector current $I_{C2}$ is not varied, the existing situation remains actually unchanged and the diode $D_{C2}$ may act as a shortcircuit for the source 5 so that the current $\alpha I_{E2}$ does not yet flow in spite of the fact that the emitter current $I_{E2}$ is no longer 0.

This situation is maintained approximately to the instant $t_3$ at which time the collector current $I_{C2}$ becomes 0. This means that at this instant the electromagnetic energy has completely disappeared from the deflection coil $L_y$. Owing to the fact that by opening the switch $T_1$ at the instant $t_2$ all the conditions for a normal operation of the transistor $T_2$ have already been fulfilled, the base current applied from the instant $t_3$ keeps the transistor $T_2$ in the saturated state.

Figure 5:
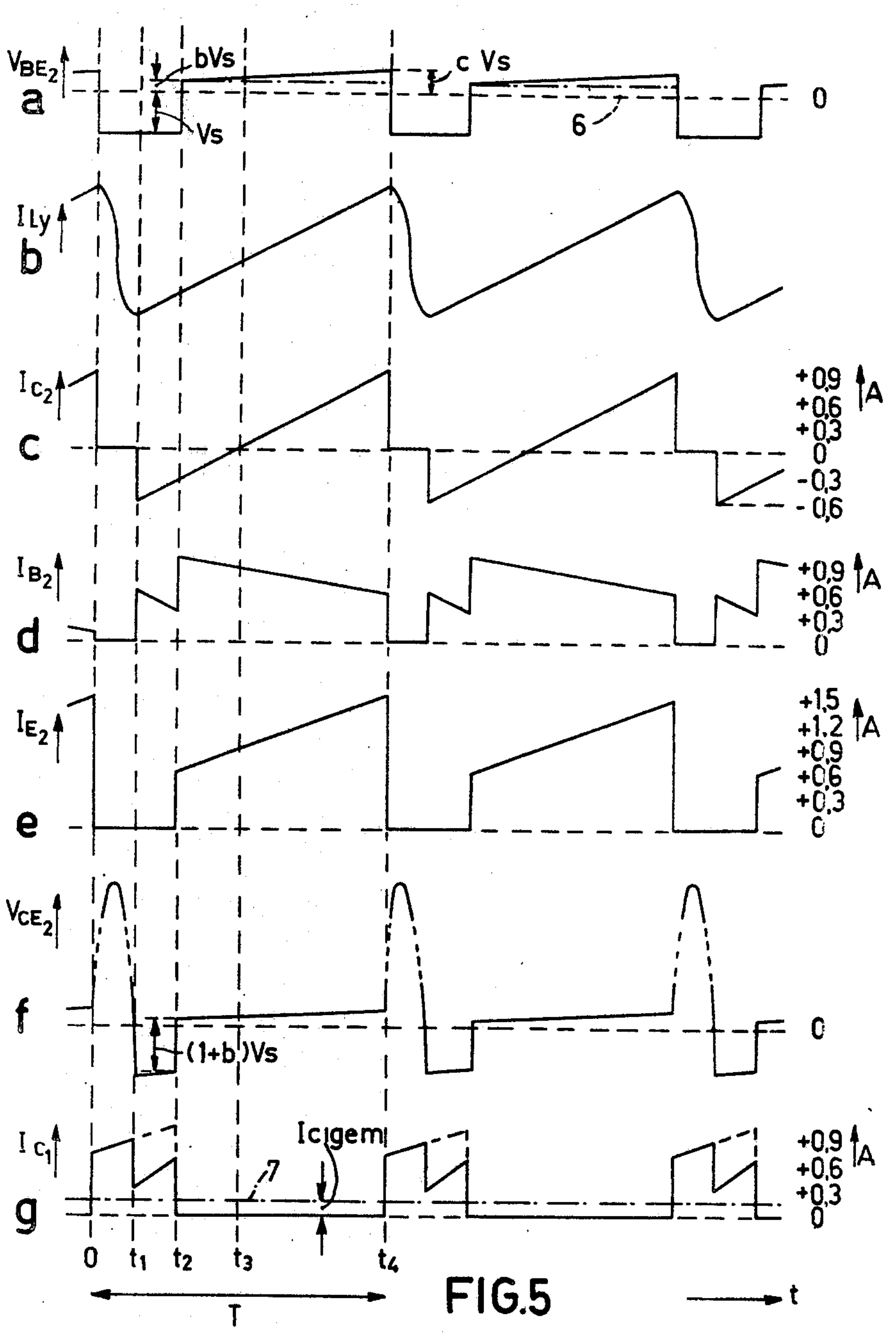

In the embodiment shown in FIG. 1, $\alpha'$ has a low value so that also in normal operation the current amplification from the base to the collector is small in the time interval from $t_3$ to $t_4$. With currents as shown in FIG. 5, $\alpha'$ amounted to 1.5. Otherwise, the operation of the line output transistor $T_2$ in the time interval from $t_3$ to $t_4$ is similar to that of a conventional transistor. As a result, the current $I_{C2}$, and hence the current through the deflection coil $L_y$, will increase to a given value which, as stated above, is determined by the voltage $V_H - bV_s$. At the instant $t_4$, the switch $T_1$ is closed again and the cycle described before is repeated.

Although in the foregoing it is assumed that the transistor $T_2$ is an npn-type transistor and that the transistor $T_1$ is a pnp-type transistor, these transistors may be of any other type. Only the polarity of the applied supply voltages $V_H$ and $V_s$ and the direction of winding of the transformer 1 must be taken into account.

Alternatively, the collector C of the transistor $T_2$ may be grounded instead of the emitter E. In this case, it is desirable also to exchange the parallel-combination of $L_y$ and $C_y$ with the supply voltage source $V_H$ so that in fact a grounded collector arrangement is obtained. The operation is analogous, however, to that of the arrangement of FIG. 1.

It is not always necessary to establish the coupling with the base electrode of the transistor $T_2$ via a transformer. One coil could be sufficient which is connected in parallel between the base electrode and the emitter electrode of the transistor $T_2$. In this case, the switching transistor $T_1$ may be arranged between the supply voltage source $V_s$ and the coil.

A second embodiment of a circuit arrangement in accordance with the invention is shown in FIG. 6. This embodiment differs from that of FIG. 1 in that instead of an asymmetrical driver transistor $T_1$ a symmetrical transistor of the npn-type is used. As a result, the switching signal must also be of opposite polarity and therefore has a configuration as represented by the signal 3' in FIG. 6. Furthermore, the driver transistor $T_1$ is now energized by means of an RC circuit consisting of the resistor 8 and a large capacitor 9. Moreover, the transformer 1 is chosen to be considerably larger than the corresponding transformer 1 of FIG. 1. Consequently, the magnetization current required to maintain the desired base current $I_{B2}$ during the time interval from $t_2$ to $t_4$ may be considerably lower than in the corresponding case of FIG. 1, because the current $$I_X=\frac{V_s}{L_x}t$$

as shown in FIG. 3, flows through the coil $L_x$ and will be considerably lower in the circuit arrangement of FIG. 6 than in that of FIG. 1 during the interval from 0 to $t_1$. (cf. FIGS. 5*g* and 7*g*).

Figure 7:
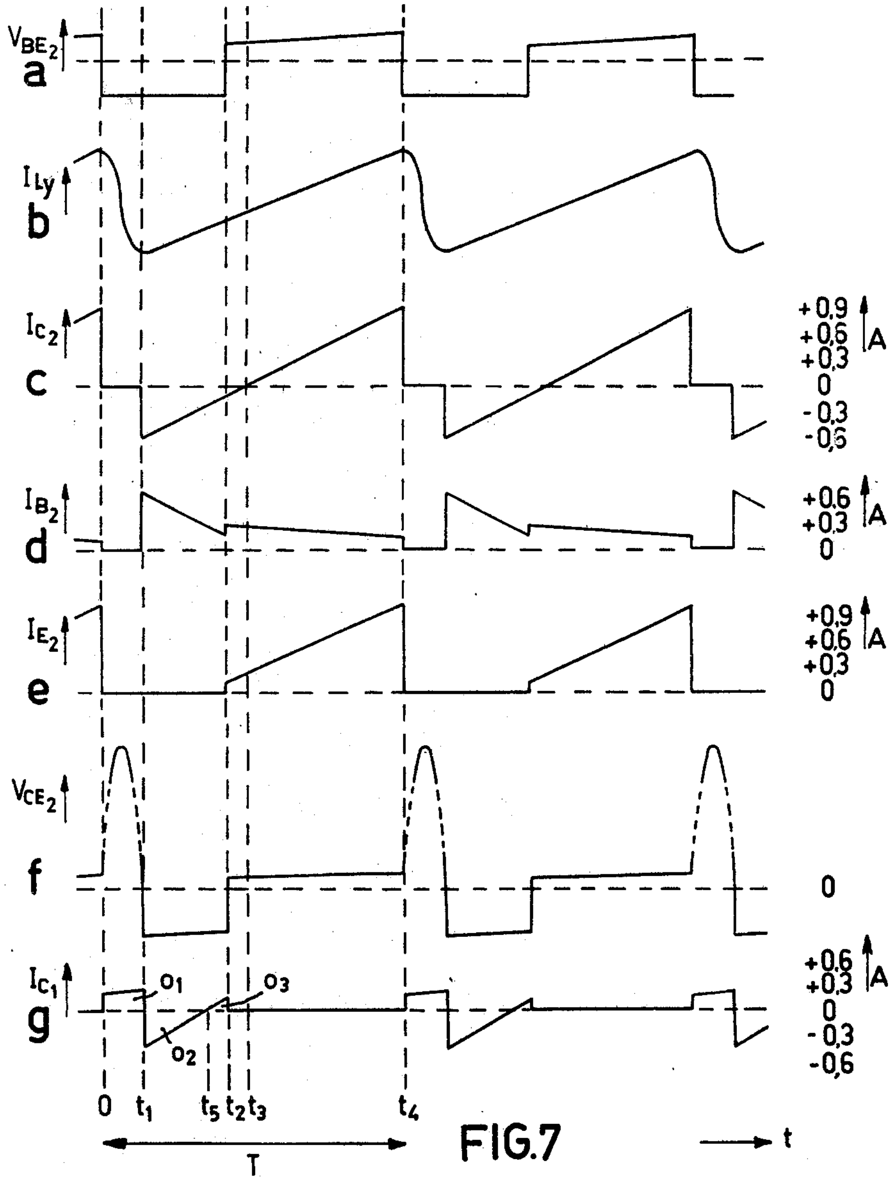

Owing to the fact that during the time interval from 0 to $t_1$ the current $I_{C1}$ has assumed a much lower value due to the increase of $L_x$ resulting from the increase of the transformer 1, whereas the collector current $I_{C2}$ which begins to flow at the instant $t_1$ has not varied at all, the decrease of the collector current $I_{C1}$ will be such that this collector current changes its sign, which is clearly apparent from FIG. 7*g*. For this reason, the transistor $T_1$ of FIG. 6 is a symmetrical transistor. Of course, start could in principle be made again from the fact that the inversion of the collector current $I_{C1}$ would result in that the base-collector diode of the transistor $T_1$ would be unblocked. This would mean, however, that an additional current would be derived from the oscillator supplying the switching signal 3'. This would have an unfavourable reaction on the oscillator so that its frequency could vary and consequently the synchronization of the horizontal deflection could be lost. However, when a symmetrical transistor is used and when it is ensured that the transistor $T_1$ is constantly kept in the saturated state by the base current $I_{B1}$, this risk can be avoided. This also influences the release of the transistor $T_1$, for in the time interval from $t_1$ to $t_5$ the driver current is negative. This means that the collector electrode of the transistor $T_1$ acts as an emitter. Consequently, the base-collector diode of the transistor $T_1$ in fact would have to be cut off by the switching-off voltage, which is virtually impossible due to the current superimposed from the collector circuit. Preferably the instant of switching off the transistor $T_1$ is therefore shifted from $t_2$ to $t_5$ This means that the time interval from 0 to $t_2$ as shown in FIG. 7, which holds for the circuit arrangement of FIG 6, is lengthened with respect to that shown in FIG. 5 which holds for the circuit arrangement of FIG. 1. However, it should be taken into consideration that the instant $t_2$ must absolutely precede the instant $t_3$, since from the instant $t_3$ the transistor $T_2$ must be able to operate again as a normal transistor, which is possible only in case the transistor $T_1$ is cut off. As is apparent, however, from FIG. 7, there is still a wide choice since the time interval from $t_5$ to $t_3$ constitutes a fairly great fraction of the cycle T.

As appears from FIGS. 7*c* and 7*d*, the $\alpha'$ for the transistor $T_2$ of FIG. 6 is chosen considerably higher than in the embodiment shown in FIG. 1. In the case of FIG. 6, the $\alpha'$ is chosen to be equal to 6. It will be appreciated, however, that both in the case of FIG. 1 and in that of FIG. 6 other values may also be chosen for $\alpha'$. When a symmetrical driver transistor $T_1$ is used, the $\alpha'$ of the transistor $T_2$ may consequently assume considerably higher values. Thus, a value of $\alpha'=10$ or even higher is still possible.

In the foregoing, it has always been assumed that $V_H=220$ v., while $(1+b)V_s\approx 7$ v. This results in a ratio of $$\frac{220}{7}\approx 30$$

which means that the supply voltage applied to the transistor $T_2$ is approximately 30 times the peak-to-peak value of the switching signal applied between the base electrode and the emitter electrode of the transistor $T_2$. In general, a satisfactory circuit operation is obtained if the ratio $$\frac{V_H}{(1+b)V_s}\geq 10$$

holds for transistor$T_2$. However, it will be appreciated that said ratio cannot be reduced without limitation, since otherwise the bend in the sawtooth current $I_{Ly}$ occurring at the instant $t_2$ becomes excessively great. Moreover, at too low a value of $V_H$, the collector current $I_{C2}$ would have to assume too high a value, since the product of current and voltage determines the power required to obtain in a given coil $L_y$ the desired deflection of the electron beam. Thus, if $V_H$ is chosen lower, $I_{C2}$ must be chosen higher. In the time interval from $t_1$ to $t_2$ it holds that $I_{C2}=I_{B2}$ so that a higher $I_{C2}$ results in a higher $I_{B2}$, which might cause the base current to assume an excessively high value. It may therefore be said that a ratio between $V_H$ and $V_S$ of 10:1 substantially is the minimum ratio at which the circuit arrangement can operate satisfactorily.

As already stated above, in the circuit arrangement of FIG. 6, the peak-to-peak value of the switching signal 3' must have a value such that the driver transistor $T_1$ remains in the saturated state during the time interval from $t_1$ to $t_2$ so that it is ensured that the switching signal 3' switches the transistor $T_1$, and that the voltages applied to the collector electrode cannot cause this transistor to be cut off prematurely.

It is further apparent from FIG. 7*g* that the average collector current of the transistor $T_1$ is very low due to the fact that this current becomes negative during the time interval from $t_1$ to $t_5$. This average current could even be reduced to 0 if it holds that $O_1+O_3=O_2$, $O_1$, $O_2$ and $O_3$ denoting the areas shown in FIG. 7. However, in practice $O_1+O_3$ is preferably chosen to be greater than $O_2$ so that a positive current flows through the resistor 8. However, this current may be kept very low by choosing $O_2$ to be only slightly different from $O_1+O_3$. In this case, the dissipation in the resistor 8 is comparatively low in spite of the fact that a high resistance value is required for this resistor. The correct value of the voltage $V_S$ produced across the capacitor 9 depends upon the ratio between the areas $O_1$, $O_2$ and $O_3$ which, with a given design of the output transistor $T_2$, in turn depends upon the inductance value of the coil $L_x$ and upon the value of the resistor 8 at a given supply voltage $V_H$.

The circuit arrangement shown in FIG. 6 therefore affords the advantage, in comparison with that of FIG. 1, that a separate low supply voltage $V_S$ need not be available. Thus, it becomes attractive to derive from this circuit arrangement the supply voltages for the remaining parts of a transistorized television receiver. For in this case, a supply transformer is economized. This may be achieved, for example, by coupling the deflection coils $L_y$ with a line output transformer and by providing the transformer with a tapping from which pulses of low amplitude can be derived. After being rectified and smoothed, these pulses can produce the supply voltage for the remaining transistors in the receiver. It must be taken into account that in this case the oscillator supplying the switching signal 3' is also supplied with this supply voltage. However, this supply voltage is not present before the transistor $T_1$ and $T_2$ are driven. Therefore, in order to render the circuit arrangement self-starting, it must be ensured that this drive is brought about automatically when the supply voltage $V_H$ is switched on. This may be achieved, for example, by providing a feedback capacitor between the base and collector electrode of transistor $T_1$ so that this transistor becomes self-oscillating when the supply voltage $V_H$ is switched on. However, if the value of the feedback capacitor is correctly chosen, then when the switching signal 3' becomes available it has a greater influence than the feedback action so that the transistor $T_1$ again becomes a normally driven driver transistor.

It follows from FIGS. 5*b* and 7*b* that the current flowing through the coil $L_y$ before the instant $t_1$ flows back through the capacitor $C_y$. After the instant $t_1$, this capacitor current must be taken over by the collector circuit of transistor $T_2$. This means that the collector current thereof must jump from zero to the value that the capacitor current has at the instant $t_1$. This is possible owing to the fact that, as stated above, the base collector diode $D_{C2}$ is released at the instant $t_1$. As shown in FIG. 8, however, the connections with the coil $L_y$ include stray inductances $L_p$. If, due to the inductance $L_p$, the current should be 0 before the instant $t_1$, while after this instant a current would abruptly begin to flow through this inductance, the inductances $L_p$ are abruptly excited, which together with stray capacitances in the circuit gives rise to stray oscillations at the beginning of the stroke time. This is the case if the capacitor $C_y$ is connected in parallel with the coil $L_y$.

In order to prevent the occurrence of these stray oscillations, a further improvement of the circuit arrangement in accordance with the invention consists in that the capacitor $C_y$ is connected between the base electrode B and the collector electrode C of the transistor $T_2$. From the instant $t_1$ the capacitor current is then simply passed on to the diode $D_{C2}$ which opens at this instant. This does not involve a change of the current path. An abrupt excitation of the stray inductances $L_p$ and hence the appearance of stray oscillations are avoided.

Finally, FIG. 9 shows in greater detail a circuit diagram of the circuit arrangement of FIG. 8. It appears from FIG. 9 that the supply voltage $V_H$ is obtained by a direct rectification of the AC supply voltage. For this purpose, the supply voltage is applied through the switch S to a rectifier $D_1$ which rectifies the supply voltage and which, after smoothing of this voltage by the elements $R_3$, $C_3$ and $C_4$, produces across the capacitor $C_3$ the DC supply voltage $V_H$. The supply voltage $V_H$ is applied to the line output transformer 10 between its windings 11 and 12. These windings are split up in order to ensure that the voltage pulses 14 and 15 produced at the ends of the windings 11 and 12, respectively, have opposite polarities. It is favourable that the deflection coil $L_y$ be connected in series with the linearity control member $L_2$ and the blocking capacitor $C_2$ between the ends of the windings 11 and 12, since in this case stray inductances in the windings 11 and 12 cannot give rise to undesired interferences. As a result of the opposite polarities of the pulses 14 and 15, the long conductors extending from the ends of the windings 11 and 12 to the deflection coil $L_y$ slipped around the neck of the display tube will not emit radiation.

The transformer 10 further includes a high-voltage winding 16 which steps up the pulses so that, after being rectified in the high-voltage diode $D_2$, they supply the acceleration voltage for the final anode of the display tube. The acceleration voltage is fed to this final anode through the conductor 17.

Finally, it should be noted that if the $\alpha'$ of the output transistor $T_2$ should not be chosen excessively high and if nevertheless the driver transistor $T_1$ should not be supplied from a separate supply source, the circuit arrangement shown in FIG. 10 may be used. This circuit arrangement is a further development of that shown in FIG. 6. The capacitor $C_4$ is arranged in the manner shown in FIG. 8 and the deflection coil $L_y$ is connected in series with capacitor $C_2$ in the manner shown in FIG. 9. The circuit has an output transformer 10, an additional diode 19 connected to the secondary 20 of the transformer 10, and a resistor 21.

If 1½$\alpha'$ 10($\alpha'$=1½ example of FIG. 5, $\alpha'$=10 example of FIG. 7), the value of the base current $I_{B2}$ in the time interval $t_2$ to $t_4$ lies between the values indicated in FIGS. 5*d* and 7*d*. A higher base current in this time interval implies that in the time interval $0\rightarrow t_2$ a greater amount of electromagnetic energy would have to be introduced into the inductor $L_x$ of the driver transformer 1. The driver current $I_{C1}$ and consequently also its average value must therefore increase. The value of the current $I_{C1}$ will also lie between the values indicated in FIGS. 5*g* and 7*g*.

A higher average driver current $I_{C1gem}$ results in a higher dissipation even if the resistor 8 is reduced. ($V_{R8}=I_{C1gem}.R_8$, dissipation $E_{R8}=I_{C1}{}^2{}_{gem}R_8$). Therefore, if a low-voltage transistor were used for the driver transistor $T_1$, the losses in resistor 8 would become excessively high.

The solution of this problem is illustrated in FIG. 10. Resistor 21 has a double function. When the circuit arrangement starts after switching on the supply voltage $V_H$, the resistor 21 acts together with resistor 8 as a voltage divider the required supply voltage is supplied from the junction of resistors 8 and 21 to the transistor $T_1$. Resistors 8 and 21 may both be high since the starting current is fairly low. This current need be only so high that the pulses $V_{CE2}$ (cf. FIGS. 5*f* and 7*f*) produced during the fly-back time $0\rightarrow t_1$ and induced in the secondary 20 have an amplitude exceeding the voltage at the junction of the resistors 8 and 21. The diode 19 then becomes conducting at the peaks of these pulses and consequently rectifies these pulses. The rectified voltage is smoothed by the network 9–21 so that an additional amount of energy is supplied to the supply circuit for the driver transistor $T_1$.

Thus, this circuit arrangement is automatically matched to the $\alpha'$ of the output transistor $T_2$. Therefore, if $\alpha'$ originally had a high value, $I_{C1gem}$ is low. The voltage drop across resistor 8 is low and the diode 19 remains blocked during the circuit operation. If $\alpha'$ decreases due to ageing, $I_{C1gem}$ and consequently the voltage drop across resistor 8 increases so that the diode 19 becomes operative. A satisfactory operation of the circuit arrangement without unnecessary dissipation in resistor 8 is thus ensured in all circumstances.

Moreover, wider tolerances of $\alpha'$ of transistor $T_2$ are now permissible. If $\alpha'$ is high, the diode 19 does not become operative, whereas if $\alpha'$ is low, the diode becomes operative.

What is claimed is:

1. A deflection circuit for producing a sawtooth current having a given flyback period in the line deflection coils of a display tube comprising, a unidirectional transistor having an output circuit to which the deflection coils are connected, inductive coupling means including an inductor directly connected between the base electrode and the emitter electrode of said transistor, means for applying to said inductive coupling means a pulsatory switching signal having a peak-to-peak amplitude which periodically switches the transistor between a cut-off condition and a saturation condition, the duration of the portion of the switching signal pulse which cuts off the transistor being longer than the flyback period of the sawtooth current so that at the beginning of the forward stroke a voltage is developed across said deflection coils of an amplitude and polarity to cause a reverse current to flow through the deflection coils via the base-collector diode junction of the transistor, and a supply voltage coupled to the transistor that exceeds by at least 10 times the peak-to-peak value of said switching signal applied between the transistor base and emitter electrodes.

2. A circuit as claimed in claim 1 wherein the inductive coupling means comprises a transformer having a primary windin and a secondary winding, means directly connecting the two ends of the secondary winding to the base electrode and the emitter electrode of the transistor, a driver transistor, a second source of supply voltage, means connecting the primary winding in series with the emitter-collector path of said driver transistor to said second supply voltage, the amplitude of said second supply voltage being at least 10 times lower than that of the supply voltage of said unidirectional transistor.

3. A circuit arrangement as claimed in claim 2 wherein the transformation ratio between the primary and the secondary windings of the transformer is 1:1.

4. A circuit arrangement as claimed in claim 2 wherein the inductance value of said inductive coupling means is chosen to be so high that the current flowing through it during the flyback period of the sawtooth current is lower than the inverse collector current that flows in said unidirectional transistor immediately at the beginning of the stroke period via its base-collector diode junction, whereby the direction of the emitter-collector current of the driver transistor reverses at the beginning of the forward stroke.

5. A circuit arrangement as claimed in claim 4 wherein the driver transistor is a symmetrical transistor.

6. A circuit arrangement as claimed in claim 5 wherein said second voltage supply source for the driver transistor comprises, a capacitor, a resistor, and means connecting the capacitor to the voltage supply source of the unidirectional transistor by means of said resistor.

7. A circuit arrangement as claimed in claim 6 wherein the inductance value of the inductive coupling means is chosen so that said driver transistor draws an average current differing from zero from the supply voltage source of the unidirectional transistor.

8. A circuit arrangement as claimed in claim 1 further comprising a capacitor that resonates with the deflection coils to determine the flyback period of said sawtooth current, and means connecting said capacitor between the base electrode and the collector electrode of the unidirectional transistor.

9. A deflection circuit for producing a sawtooth current having a given flyback period in a deflection coil comprising, a unidirectional semiconductor device having emitter, base and collector electrodes, means for coupling said deflection coil to the output circuit of the semiconductor device, inductive coupling means comprising an inductor directly connected between the base and emitter of said semiconductor device, means for applying to said inductive coupling means a control voltage wave having a peak-to-peak amplitude and polarity to periodically cut off current flow in said semiconductor device, the duration of the cut-off period of said voltage wave being longer than said given flyback period so that a voltage reversal occurs across said deflection coil of a magnitude and polarity to forward bias the base-collector junction of said semiconductor device during a portion of the period when said voltage wave cuts off the semiconductor device, and a source of direct voltage coupled to said collector electrode of a magnitude at least ten times the peak-to-peak voltage of said control voltage.

10. A circuit as described in claim 9 further comprising means connecting said deflection coil and said direct voltage source in series across the emitter-collector path of said semiconductor device.

11. A circuit as described in claim 9 wherein said semiconductor device is connected in the common emitter configuration, said circuit further comprising a capacitor connected between the base and collector of said semiconductor device so as to resonate with the deflection coil during the flyback period of the sawtooth current.

12. A circuit as described in claim 11 further comprising a drive transistor having an output electrode coupled to said inductive coupling means and to a source of direct supply voltage, a deflection transformer having a primary winding coupled to the collector electrode of said semiconductor device and a secondary winding, a diode connected between said secondary winding and said source of direct supply voltage for coupling a portion of the flyback pulses to said supply voltage source.

References Cited

UNITED STATES PATENTS

| | | |
|---|---|---|
| 3,204,145 | 8/1965 | Schneider. |
| 3,302,033 | 1/1967 | Goodrich. |

RODNEY D. BENNETT, Jr., Primary Examiner
JOSEPH G. BAXTER, Assistant Examiner